Oct. 14, 1941.  H. G. LEHMANN  2,258,589
COFFEE MAKER
Original Filed Sept. 8, 1939
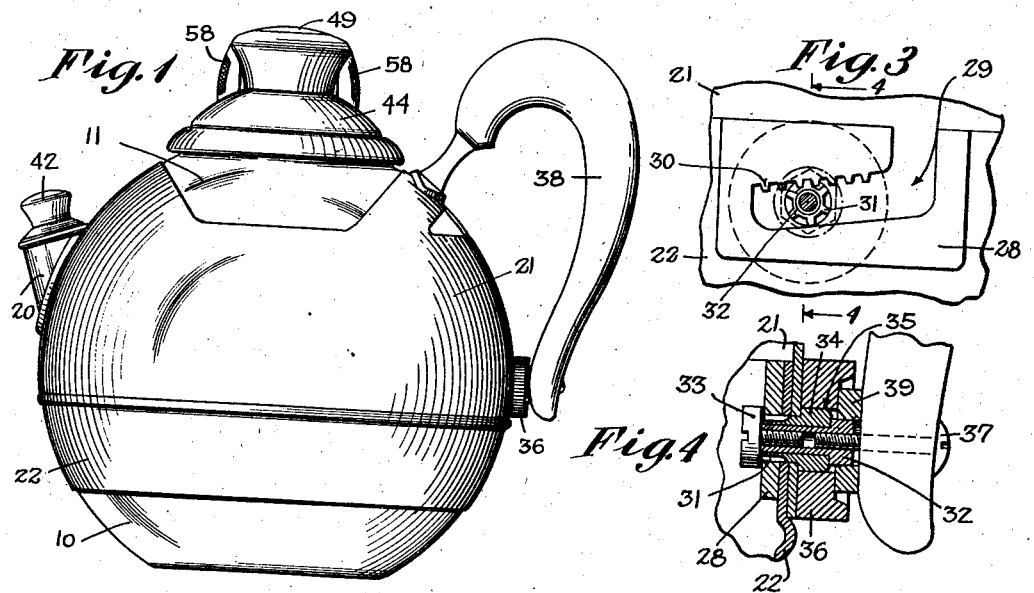
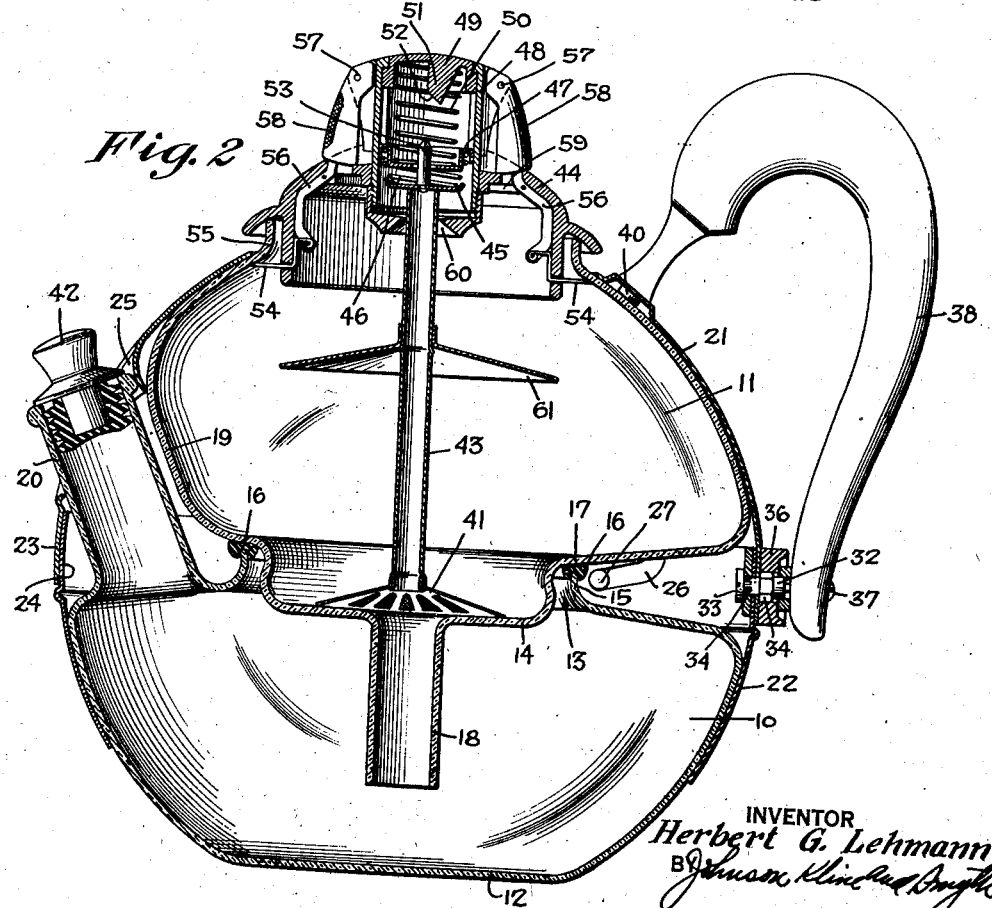
INVENTOR
Herbert G. Lehmann
BY
ATTORNEYS Patented Oct. 14, 1941

2,258,589

UNITED STATES PATENT OFFICE 2,258,589

COFFEE MAKER

Herbert G. Lehmann, Wood-Ridge, N. J., assignor to Casco Products Corporation, Bridgeport, Conn., a corporation of Connecticut Original application September 8, 1939, Serial No. 293,875. Divided and this application March 7, 1940, Serial No. 322,671

8 Claims. (Cl. 53—3)

This invention relates to vacuum type coffee-makers, and more particularly, to means for holding the lower and upper vessels superposed as a unit and with the seal therebetween mechanically maintained at all times.

This application is a division of my copending application Serial No. 293,875, filed September 8, 1939.

In coffee makers of the vacuum type, it was heretofore the custom to provide a lower vessel with a single opening or orifice into which a hollow stem on the upper vessel extends and by the walls of which the upper vessel is supported. Consequently, to pour the brewed coffee from the lower vessel, it was necessary to remove the upper vessel and store it in some safe place. The storing of the upper vessel is frequently quite a problem, for it cannot be supported upright, except on a spindle-like holder which passes through the tube at the bottom of the vessel, and when so supported is easily tipped over because the main weight of the body is so high above the supporting surface.

Another difficulty with the vacuum type coffee makers as heretofore constructed has been the danger of the coffee maker tipping over while the coffee is being brewed, for the weight of the water when forced into the upper vessel moves the center of gravity high above the relatively limited supporting surface of the lower vessel. Besides, when the water from the lower vessel has been expelled to a point where the level thereof is below the orifice of the downwardly projecting tube, bubbles of air are forced up through the liquid in the upper vessel causing considerable agitation and frequently breaking the air-tight seal between the tube and the neck of the lower vessel.

The difficulties above referred to are obviated by the present invention by the provision of a coffee maker of the vacuum type in which the upper vessel and the lower vessel may remain united as one, both while the coffee is being made and while it is being poured from the coffee maker after being brewed. This arrangement permits coffee to be brewed and served at the dining table without the inconvenience and bother which is now attendant upon the removal of the upper vessel after the coffee is brewed and before it may be served. By this arrangement, the seal between the upper and lower chamber is mechanically maintained so that there is no likelihood of seepage of air into the lower vessel through this seal, which seepage would delay the return of the brewed coffee to the lower vessel and might even prevent the return of some of the brewed coffee to the lower vessel.

The upper and lower vessels of the coffee maker of the present invention are so shaped that, when the upper vessel is superposed on the lower vessel, the two together form a substantially spherical utensil.

One of the features of this invention is the provision of a casing for securing these two vessels together so that they can be lifted and transported by a suitable handle as one vessel. The casing preferably comprises two sections embracing the upper and lower vessels and having overlapping portions so formed that the two sections will be drawn together when the sections are rotated relative to one another.

Another feature of this invention is the provision of readily accessible means for causing the sections to rotate relative to one another and cause them to be drawn together to lock the two vessels together as a unitary utensil so that they can be lifed and transported by the handle fixed to the casing.

Other features and advantages will hereinafter appear.

In the accompanying drawing:

Figure 1 is a side elevation showing the coffee maker arranged for brewing coffee.

Fig. 2 is a vertical section through the coffee maker of the present invention showing the parts in the positions they occupy during the brewing of the coffee.

Fig. 3 is a detailed view showing the means for relatively rotating the casing parts for securing the two vessels together as a unitary utensil.

Fig. 4 is a sectional view taken along line 4—4 of Fig. 3.

As shown in the accompanying drawing, and referring particularly to Figs. 1 and 2, the coffee maker of the present invention comprises a lower vessel 10 and an upper vessel 11, each vessel being approximately hemispherical and having their relatively flat sides adjacent so that when they are assembled they will form a substantially spherical body.

The bottom of the lower vessel 10 is provided with a flat surface 12 by means of which the coffee maker may be supported, and at its upper end the vessel 10 has a relatively wide open mouth 13 adapted to receive a sump portion 14 of the upper vessel 11. A lip 15 of the mouth 13 supports a gasket 16 of rubber or other suitable material which is engaged by a bottom portion 17 of the upper vessel 11 and supports the upper vessel on the lower vessel with the sump 14 extending into the lower vessel. The upper vessel has the usual downwardly extending tube 18 through which water contained within the bottom vessel 10 when heated will pass upwardly through ground coffee in the sump 14 and into the upper vessel 11 where the coffee is brewed.

As shown in Fig. 2, the upper vessel 11 is flattened or otherwise suitably shaped at 19 to provide space for an upwardly extending spout 20 connected to the lower vessel and through which the brewed coffee may be poured when serving.

According to the present invention, the lower vessel 10 and the upper vessel 11 are united as one, and for this purpose any suitable means may be employed. However, it is at present preferred to unite the two vessels by providing two properly shaped casings 21 and 22 overlying and underlying respectively the largest dimensions of the vessels 11 and 10. These casing parts are provided with overlapping marginal portions 23 and 24 which are secured together, and the upper casing 21 is provided with an aperture 25 through which the spout 20 extends.

The casing parts 21 and 22 are secured together by bayonet locks comprising slots 26 in the part 22 and pins 27 in the part 21. After the vessels 10 and 11 are superposed, the parts 21 and 22 are placed over and under them so that the pins 27 enter the openings of the slot 26, whereupon the lower part is turned relative to the upper part causing the parts to be drawn together by the inclined walls of the slots 26.

To facilitate the relative movement between the parts 21 and 22 of the casing, actuating mechanism shown in Figs. 3 and 4 may be employed. For this purpose, the lower casing part 22 is thickened and reenforced by a plate 28 provided with a slot 29 and having gear teeth 30 on one wall of the slot forming a rack. These gear teeth are engaged by a pinion 31 carried by a shaft 32 and extend through a hole in the upper part 21 of the casing. A screw 33 extends into the inner end of shaft 32 and has a head engaging the plate 28 to keep the plate from springing inwardly and out of mesh with the pinion 31. The pinion 31 is formed at its outer end with a nut-like member 34 received within a socket 35 of a knurled knob 36 by means of which the pinion may be turned, and when it is turned to the right the pinion causes the rack to advance to the right and thereby moves the lower part 22 relative to the upper part 21 drawing the two parts tightly together.

The shaft is internally threaded and takes a screw 37 by means of which a handle 38 may be secured to the casing, a spacing washer 39 being interposed between the handle and the adjusting knob 36. The upper end of the handle 38 is suitably secured, as by a rivet 40, to the upper portion of the casing part 21. The bayonet lock pins and the tightening mechanism, including the plate 28, are located in the space between the bottom of the upper vessel and the top of the lower vessel.

In the broader aspects of this invention, any suitable filter or strainer may be used to retain the coffee grounds in the sump 14 or other lower part of the upper vessel 11.

In the form of the invention herein disclosed, this is accomplished by providing an apertured plate 41 which fits over the opening at the upper end of the tube 18 and which may be covered with suitable cloth to strain the brewed coffee and prevent the grounds from passing down into the lower chamber.

While the water is being heated to drive it up into the vessel 11, it is, of course, essential to prevent the escape of air from the lower vessel 10, because it is the expansion of the water and air in the lower vessel 10 which causes the water to rise in the tube 18. For this purpose, the spout 20 is provided with a stopper 42 which, of course, may be removed when it is desired to pour the brewed coffee.

When brewed coffee is to be poured from the lower vessel 10, it is necessary for the liquid removed to be replaced by air. I have found that the ground coffee in the sump 14 packs so tightly that sufficient air cannot enter the lower vessel through the compacted and wet ground coffee. I have also found that if the brewed coffee is poured rapidly from the spout 12, the in-rush of air tends to gurgle and cause the coffee to be spattered rather than to fall in a smooth stream into the cup.

According to the present invention in its broader aspects, any suitable means may be employed for introducing air to the lower vessel 10 when pouring the coffee through the spout 20. In the specific embodiment of the invention claimed in my copending application Serial No. 293,875, filed September 8, 1939, and illustrated herein as exemplary thereof, this is accomplished by providing an air inlet tube 43, and conveniently this air inlet tube may be secured to and be supported by the filter plate 41. This tube extends upwardly through the upper vessel 11 and to a point near the top thereof, and is held closed against the passage of air or water while the water in the lower vessel 10 is being heated. Otherwise, the heated water would not be forced into the upper vessel 11.

For the purpose of normally closing the air inlet tube 43, a cap 44 for the upper vessel is provided with a valve disk 45 engaging the upper edge of the tube 43 under pressure of a spring 46. This spring 46 in turn engages a wall 47 within a tube 48 which is preferably molded in the cap 44. Slidably mounted within the tube 48 is a button 49 normally held in the position shown in Fig. 2 by a spring 50 contacting the wall 47 at its lower end. This button 49 is provided with a downwardly extending lug 51, the end of which has an incline 52. The lug 51 is located directly above a pin 53 on the valve disk 45.

When the button 49 is pushed down, the incline or cam 52 on the lug 51 engages the pin 53 and tilts the valve disk to one side, thereby raising the disk from one side of the tube 43 and permitting air to enter the tube.

The button 49 may be held down in any suitable way, but, according to the invention in its illustrated form, the button is operated and maintained depressed by the stopper 42, which, when it is removed from the spout 20, may be placed against the button 49 and pressed downwardly until the lug 51 engages the pin 53 and tilts the valve disk to one side. The stopper is frictionally held in this depressed position until removed.

Thus, not only is the air vent valve automatically operated by the insertion of the stopper, but a convenient place to store the stopper during the pouring of the coffee is provided.

The cap 44 does not have an air-tight connection with the upper vessel 11, and therefore the interior of the upper chamber also has free communication with the atmosphere.

The cap 44 may be secured in place on the top of the upper vessel 11 by any suitable means. The means provided for this purpose by the present invention comprises a pair of slide bolts 54 adapted to extend under a curved shoulder 55 provided at the mouth of the vessel 11 and pivotally attached to arms 56 which are pivoted at 57 and having finger pieces 58 by means of which they may be swung inwardly. The finger pieces 58 extend outwardly through slots in the cap 44 and are held in their outward position with the slide bolts 54 in the position shown in Fig. 2 by a spring 59.

The slide bolts 54 engaging the downwardly and outwardly inclined surface of the upper vessel and being spring pressed outwardly, tend to draw the cap 44 tightly against the mouth of the vessel 11, holding the valve disk 45 against the air inlet tube, even though there may be the ordinary variations of the size and shape of the vessel 11.

The cap 44 is provided with a central aperture 60 through which the upper end of the air inlet tube 43 extends and by which it is centralized and supported against tilting over.

To prevent fluid which bubbles in the upper vessel 11 from splashing out through the apertures in the cap 44, a deflector plate 61 may be provided on the air inlet tube as shown in Fig. 2. Thus, it will be seen that one single removable piece serves as a filter support and air inlet tube and a baffle. When the cap 44 is removed, this piece may be easily removed through the open top of the vessel 11 for cleansing.

Variations and modifications may be made within the scope of this invention and portions of the improvements may be used without others.

I claim:

1. A coffee maker comprising an approximately hemispherical lower vessel and an approximately hemispherical upper vessel, said vessels being superposed with their respective flat sides adjacent; a casing having an upper part and a lower part adapted respectively to embrace the upper and lower vessels; means for mechanically locking the two parts of the casing together to unite said vessels together as one unitary utensil, upon relative rotation of the two parts; and means by which the two parts may be relatively rotated for the purpose of securing the two parts of the casing and the two vessels together as one unitary utensil.

2. A coffee maker comprising an approximately hemispherical lower vessel and an approximately hemispherical upper vessel, said vessels being superposed with their respective flat sides adjacent; a casing having an upper part and a lower part adapted respectively to embrace the upper and lower vessels, said two parts of the casing telescoping one within the other; means, including bayonet locks, between the telescoping portions of the casing parts adapted upon rotation of one part relative to the other to draw the same together and secure the two parts of the casing and the two vessels together as one unitary utensil; and means by which the two parts may be relatively rotated for the purpose of securing the two parts of the casing and the two vessels together as one unitary utensil.

3. A coffee maker comprising an approximately hemispherical lower vessel and an approximately hemispherical upper vessel, said vessels being superposed with their respective flat sides adjacent; a casing having an upper part and a lower part adapted respectively to embrace the upper and lower vessels, said two parts of the casing telescoping one within the other; means, including bayonet locks, between the telescoping portions of the casing parts adapted upon rotation of one part relative to the other to draw the same together and secure the two parts of the casing and the two vessels together as one unitary utensil; and a pinion and rack connection between said two parts by means of which the parts may be rotated relatively for the purpose of locking them together.

4. A coffee maker comprising an approximately hemispherical lower vessel and an approximately hemispherical upper vessel, said vessels being superposed with their respective flat sides adjacent; a casing having an upper part and a lower part adapted respectively to embrace the upper and lower vessels, said two parts of the casing telescoping one within the other; means, including bayonet locks, between the telescoping portions of the casing parts adapted upon rotation of one part relative to the other to draw the same together and secure the two parts of the casing and the two vessels together as one unitary utensil; and a pinion and rack connection between said parts by means of which the parts may be rotated for the purpose of drawing the same together, said pinion and rack connection being positioned interiorly of the casing.

5. A coffee maker comprising an approximately hemispherical lower vessel and an approximately hemispherical upper vessel, said vessels being superposed with their respective flat sides adjacent; a casing having an upper part and a lower part adapted respectively to embrace the upper and lower vessels, said two parts of the casing telescoping one within the other; means, including bayonet locks, between the telescoping portions of the casing parts adapted upon rotation of one part relative to the other to draw the same together and secure the two parts of the casing and the two vessels together as one unitary utensil; a pinion and rack connection between said parts by means of which the parts may be rotated for the purpose of drawing the same together, said pinion and rack connection being positioned interiorly of the casing; and means positioned exteriorly of the casing for manual operation of the pinion and rack connection.

6. A coffee maker comprising an approximately hemispherical lower vessel and an approximately hemispherical upper vessel, said vessels being superposed with their respective flat sides adjacent; a casing having an upper part and a lower part adapted respectively to embrace the upper and lower vessels, said two parts of the casing telescoping one within the other; means, including bayonet locks, between the telescoping portions of the casing parts adapted upon rotation of one part relative to the other to draw the same together and secure the two parts of the casing and the two vessels together as one unitary utensil; a rack carried by one of said casing parts; a pinion carried interiorly of said casing and engaging said rack; and means carried exteriorly of the casing for rotating said pinion engaging the rack for rotating the parts to draw the same together.

7. A coffee maker of the vacuum type comprising a lower vessel and an upper vessel superposed on the lower vessel and having a tube extending through an aperture in the lower vessel; sealing means disposed about the lip of said aperture and adapted to engage the underneath surface of the lower wall of said upper vessel; a casing having an upper part and a lower part adapted respectively to embrace the upper and lower vessels; means for securing said two parts of the casing together upon relative rotation of the two parts; and means by which said two parts may be relatively rotated to secure the two vessels together as one unitary utensil and to cause the sealing means carried by the lip of the aperture in the upper vessel to tightly engage the underneath surface of the lower wall of the upper vessel.

8. A coffee maker comprising an approximately hemispherical lower vessel and an approximately hemispherical upper vessel, said vessels being superposed with their respective flat sides adjacent; a casing having an upper part and a lower part adapted respectively to embrace the upper and lower vessels, said two parts of the casing telescoping one within the other; draw means between the telescoping portions of the casing parts adapted upon rotation of one part relative to the other to draw the same together and secure the two parts of the casing and the two vessels together as one unitary utensil; and means by which the two parts may be relatively rotated for the purpose of securing the two parts of the casing and the two vessels together as one unitary utensil.

HERBERT G. LEHMANN.